S. ROGERS.
Car Wheel.
No. 19,445.
2 Sheets—Sheet 1.
Patented Feb. 23, 1858.
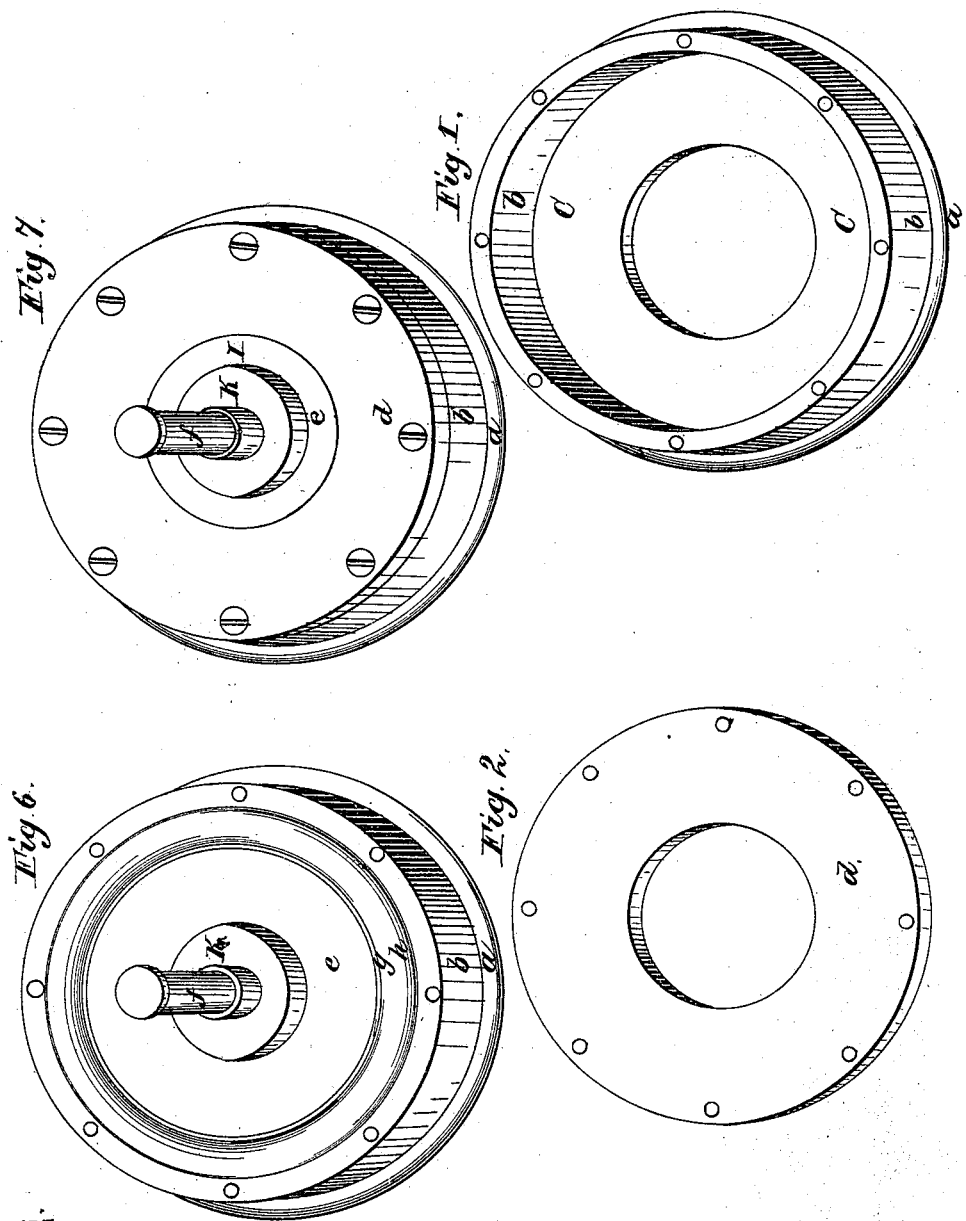
Witnesses:
Jn. Major
L. Rogers.
Inventor:
Seymour Rogers.

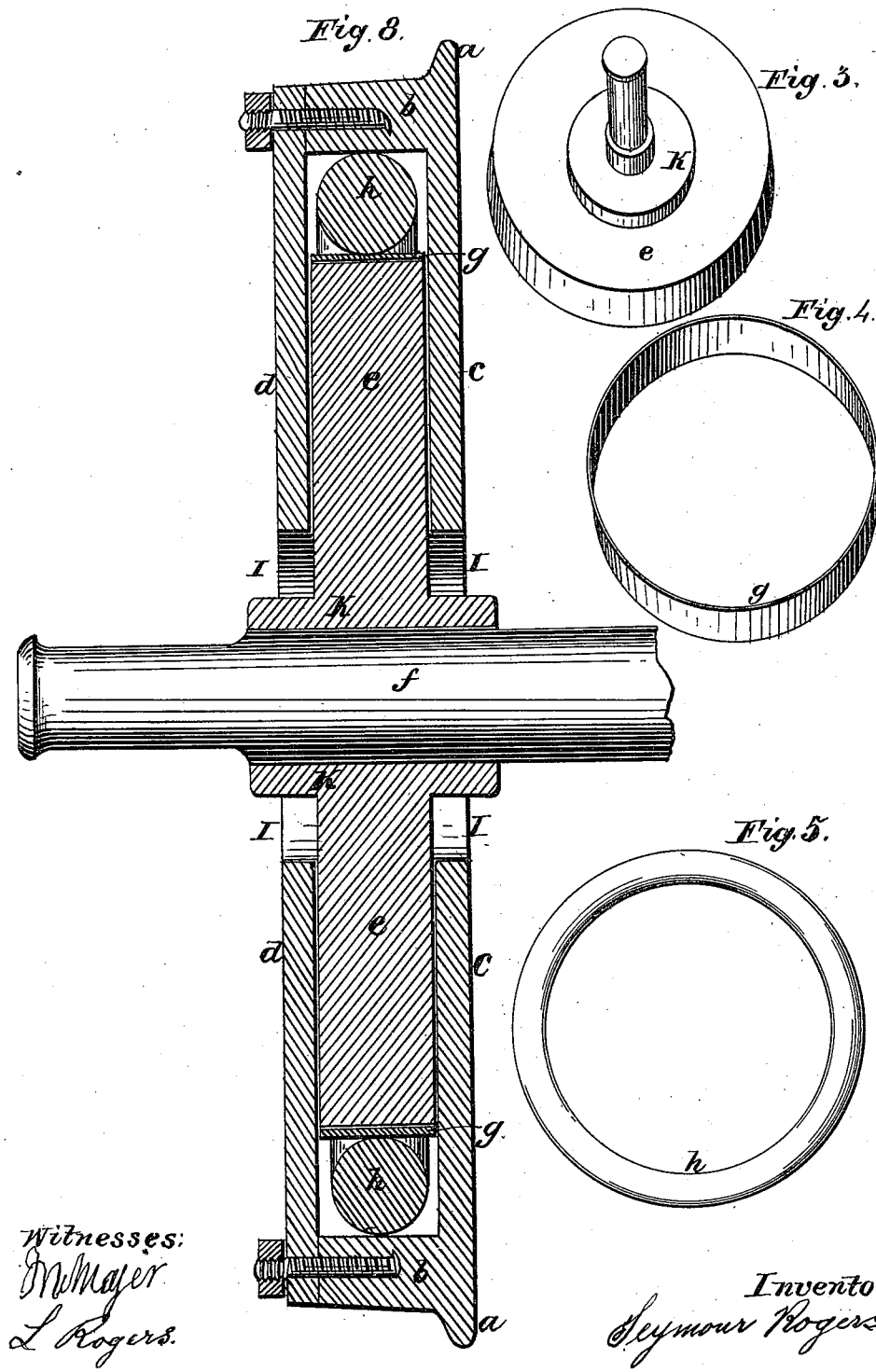

UNITED STATES PATENT OFFICE.

SEYMOUR ROGERS, OF PITTSBURGH, PENNSYLVANIA.

RAILROAD-CAR WHEEL.

Specification of Letters Patent No. 19,445, dated February 23, 1858.

*To all whom it may concern:*

Be it known that I, SEYMOUR ROGERS, of Pittsburgh, county of Allegheny, and State of Pennsylvania, have invented new and useful Improvements in the Construction of Railroad-Car Wheels; and I do hereby declare that the following is a full and exact description thereof, reference being had to the accompanying drawings and to the letters of reference marked thereon.

The nature of my invention consists in constructing railroad car wheels, in such a manner that the rim thereof may revolve independent of the hub. When required, for the purpose of obviating the difficulties attendant upon turning curves (*i. e.*, injuries to the wheel and axle from slipping and torsion;) also of constructing the wheel in such a manner that a spring may be inserted for the purpose of overcoming the injuries to the rails, wheels, axles and bearings, arising from the jolting and jarring, consequent upon any unevenness in or impediment on the track; also of deadening the noise or rumbling caused by the wheels when in motion.

Having thus set forth the objects of my invention, I will now proceed to give an explicit description of the construction thereof, and show how the above objects are attained.

First, (referring to Figure 1), I construct the flange (*a*) rim or tire (*b*) and one disk (*c*) all in one piece. The other disk (*d*) being made separate, (as seen at Fig. 2,) and attach it to the rim of the other portion of the wheel by bolts or other means. Upon putting together these pieces, there is left a cavity or space between their inner surfaces. I then construct a smaller wheel (*e*) as seen in Fig. 3, and attach it to the axle, (*f*) in the usual way. This wheel is of less diameter than the diameter of the inner surface of the rim or tire (*b*) of the outer wheel. I then make a thin metal band (*g*) Fig. 4, to fit loosely upon the wheel (*e.*) I then make a spring to fit over said " band " (*g*). This spring may be made of india rubber or other material. Fig. 5, (letter *h*) represents an india rubber spring. These are the different pieces composing the wheel, which I put together as follows: I take the piece represented in Fig. 1, composed of the flange (*a*) rim (*b*), and disk (*c*.) Into it I insert the smaller wheel (*e*,) band (*g*) and spring (*h*,) as shown in (Fig. 6,) an interior view of the wheel. By putting on the disk (*d*,) (Fig. 2,) the wheel will be complete as represented in (Fig. 7.) In this figure as also in Fig. 8, (which is a transverse sectional view of the same enlarged,) it will be seen that the hole through the center of the disks *d* and *c* is of greater diameter than the diameter of the hub (K,) therefore leaving the space shown at the letter (I.) This space is for the working of the spring (*h*,) or for the purpose of inserting a spring therein, instead of putting it immediately beneath or inside the rim or tire of the outer wheel should I think proper, or of putting springs in both places.

Having thus set forth the objects, and construction of my invention, I will now show how the objects are attained.

1st. It will be perceived that in this construction the rim or tire (*b*) of the wheel is (in a manner) disconnected from the hub (*k*) of the inner wheel (*e*,) but is sustained laterally by this wheel, and vertically by this wheel (*c*) and spring (*h*) and band (*g*) and can when required revolve independent of the hub of the supporting wheel (*e*,) and thus obviate the difficulties attendant upon turning curves. Upon a straight track the wheels and axles will all revolve together as in the ordinary way. The object of the band (*g*) is to keep the spring (*h*) off the wheel (*e*) to lessen the friction that may arise, when the rim or tire (*b*) revolves around it, when turning curves (or rather when the tire *b*, spring *h*, and band (*g*) revolve around the supporting wheel (*e*) when turning curves.)

2nd. The spring being so placed as to receive, below, the axle, and direct from the point of concussion or contact, any blow or jar, breaks its force, and thus relieves the axle and bearings in a great measure, as well as the rim of the wheel, which from the elasticity of its support, readily yields, and does not sustain the jar it would, were the same solid from the rim to the axle. This " disconnecting " of the rim or tire from the hub has a tendency to deaden the rumbling noise of the wheels when the " gum " spring is inserted.

Having thus described the nature and objects of my invention, what I claim and desire to secure by Letters Patent is—

1. So constructing a railroad car wheel that the rim thereof may revolve independent of the hub, when required, substantially as and for the purpose set forth.

2. I further claim inserting a spring or springs therein substantially as and for the purpose described.

SEYMOUR ROGERS.

Witnesses:
J. M. MAJOR,
L. ROGERS.